O. H. TEMTE.
COMBINED GARDEN WEEDER AND PULVERIZER.
APPLICATION FILED OCT. 28, 1914.

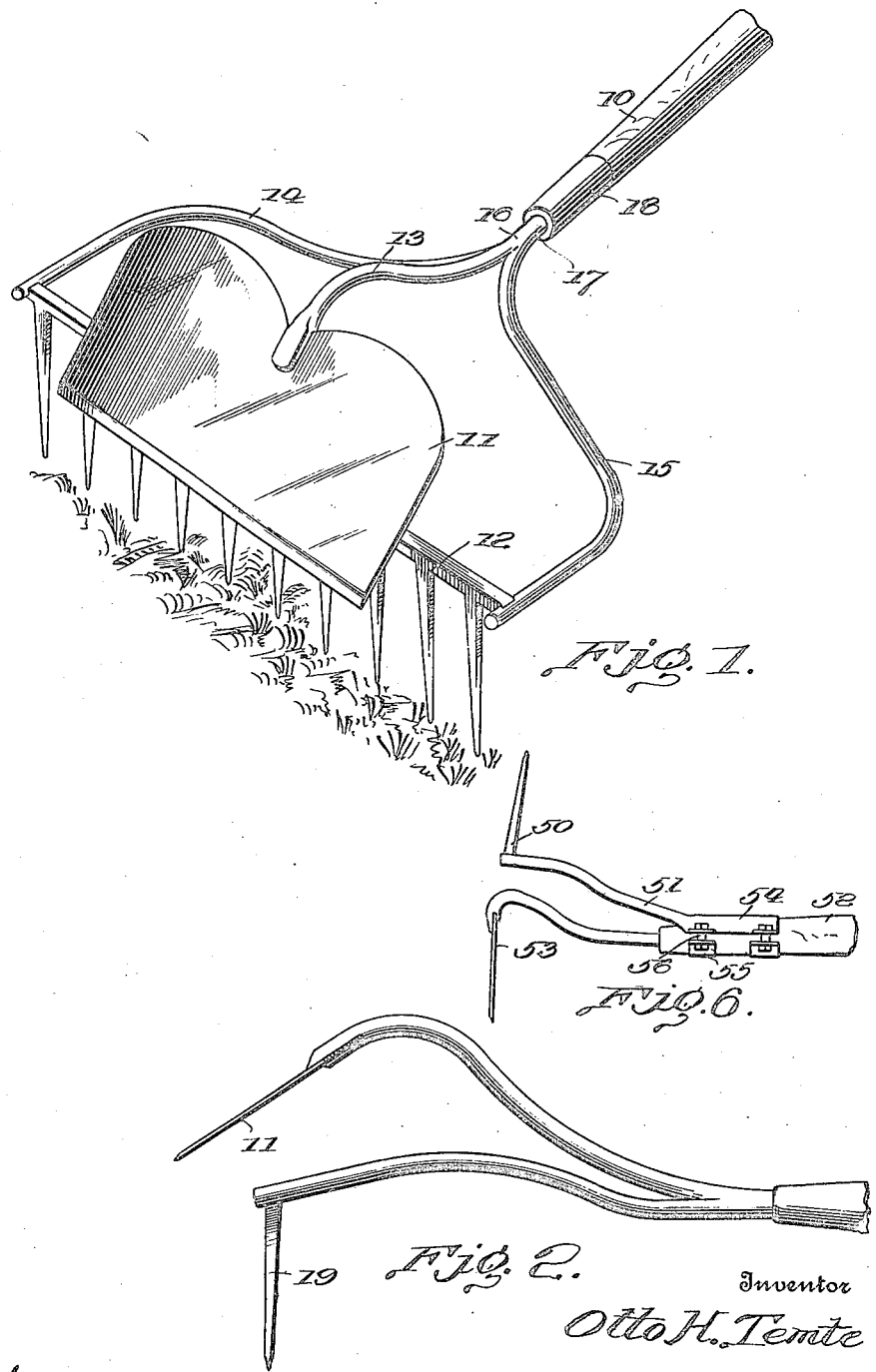

1,165,636.

Patented Dec. 28, 1915.
2 SHEETS—SHEET 2.

UNITED STATES PATENT OFFICE.

OTTO H. TEMTE, OF KATHRYN, NORTH DAKOTA.

COMBINED GARDEN WEEDER AND PULVERIZER.

1,165,636.  Specification of Letters Patent.  Patented Dec. 28, 1915.

Application filed October 28, 1914. Serial No. 869,092.

*To all whom it may concern:*

Be it known that I, OTTO H. TEMTE, a citizen of the United States, residing at Kathryn, in the county of Barnes and State of North Dakota, have invented certain new and useful Improvements in Combined Garden Weeders and Pulverizers, of which the following is a specification.

This invention relates to new and useful improvements in garden implements, and has as its principal object to provide a device of this character which will include in combination the essential features of a rake and a hoe.

It has been found in practice that a most effective implement for breaking up the crust and making a mulch after the ground has been baked following a heavy rain is the ordinary garden rake. The employment of a rake for working the earth, however, is open to the objection that the rake only loosens the surface soil and smooths it. It is, of course, desirable that the subsoil be worked up and loosened, particularly when dry farming methods are to be followed.

The principal object of my invention is, therefore, to combine in a single implement a rake and a hoe which are so arranged that the operator may at one working of the ground loosen the subsoil and surface soil and smooth out the surface.

It has been found at times that the rake is entirely sufficient for working a garden without the simultaneous use of a hoe.

A further object of my invention is, therefore, to provide a modified form of implement in which the hoe is carried by the rake so that it may be removed when desired, permitting the rake to be used by itself.

The above recited and other incidental objects of a similar nature, which will be hereinafter more specifically treated, are accomplished by such means as are illustrated in the accompanying drawings, described in the following specification, and then more particularly pointed out in the claims, which are appended hereto and form a part of this application.

Figure 3:
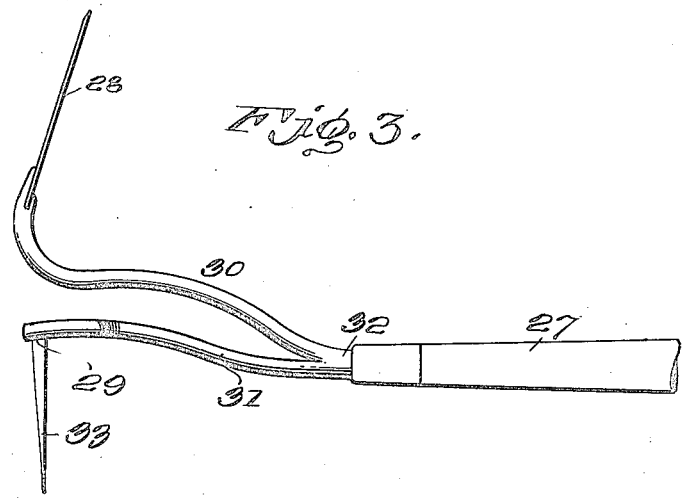
Figure 4:
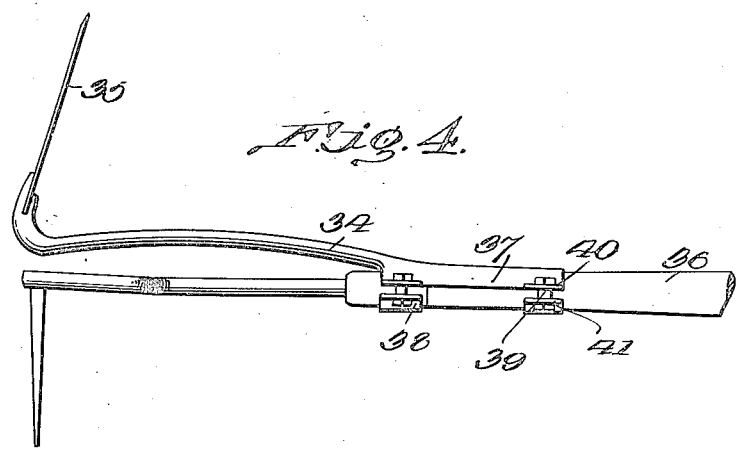
Figure 5:
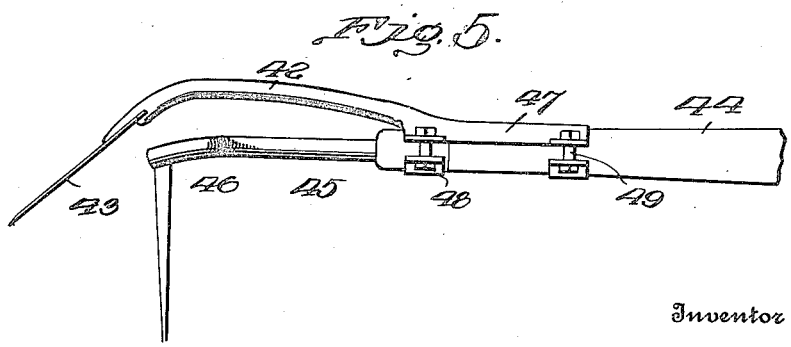

With reference to the drawings, wherein there has been illustrated the preferred embodiment of this invention as it is reduced to practice, and throughout the several views of which similar reference characters designate corresponding parts, Figure 1 is a perspective view of the preferred embodiment of the invention; Fig. 2 is a side elevation of the preferred form of the invention; Fig. 3 is a side elevation of a modified form of the implement in which the rake and hoe are provided with shanks which are integrally formed and are, therefore, rigidly connected; Fig. 4 is a side elevation of a further modification, in which the hoe is detachably connected to the rake, (in this figure the hoe blade and rake teeth extend in opposite directions, as in the embodiment shown in Fig. 3); Fig. 5 is a side elevation of a further modification, in which the hoe shank is detachably connected to the rake and the hoe blade extends in the same approximate direction as the rake teeth; and Fig. 6 is a side elevation showing a still further modification in which a rake is detachably secured to a hoe handle.

The preferred embodiment of my invention, which is illustrated in Figs. 1 and 2, includes as its essential elements a handle 10, a hoe blade 11, and a rake 12. The shank 13 of the hoe blade is formed integrally with the forked arms 14 and 15 at their junction, as indicated at 16. The enlarged shank 17, which is formed by the merging of the members 13, 14 and 15, is inserted in the handle 10 in the usual manner. A ferrule, indicated at 18, may be provided to compress the fiber of the handle about the member 17.

As shown particularly in Fig. 2, the hoe blade 11 extends at an approximate angle of forty-five degrees to the plane of the rake teeth 19. As will also be noted upon reference to Fig. 2, the handle 10 may be manipulated to turn the blade to such position that by a pushing stroke weeds, roots, lumps of dirt, and the like may be cut. In this connection, attention is directed to the fact that the shank of the hoe blade extends in lateral spaced relation upon one side of the fork arms of the rake and terminates at its outer extremity, in lateral spaced relation upon one side of the body bar of the rake. The hoe blade is directed laterally in the direction of the free ends of the rake teeth and extends obliquely and forwardly relative to the plane of said teeth, the blade being spaced laterally upon one side of the body bar of the rake and being of a width to extend throughout the major portion of the length of said bar to provide a deflecting plate adapted to direct grass or weeds over the body bar and between the said fork arms, attention being directed to the fact that the space between the body bar and the fork arms and between the hoe blade and the shank thereof is entirely unobstructed.

The modified form of the invention illustrated in Fig. 3 includes, as in the preferred form, a handle 27, a hoe blade 28, and a rake 29. The shank 30 of the hoe blade is formed integrally with the fork arms 31 of the rake and forms in connection therewith a shank 32 which is received by the handle 27. The device as shown in Fig. 3 differs from the implement of Fig. 1 in that the blade 28 extends in the opposite direction from the rake teeth 33. In this embodiment of the invention, the rake or hoe may be either one of them used independently of the other.

The embodiment shown in Fig. 4 is substantially similar to that shown in Fig. 3, except that the shank 34 of the hoe blade 35 is detachably secured to the handle 36. A channel-shaped plate 37 is formed on the free terminal of the shank 34 and is mounted on the handle 36, being secured thereto by U-shaped clips 38 and connecting bolts 39. These bolts 39 are passed through pairs of ears 40 and 41 formed respectively on the longitudinal edges of the member 37 and the terminals of the members 38.

The modification disclosed in Fig. 5 is substantially similar to the invention as shown in Figs. 1 and 2, except that the shank 42 of the hoe blade 43 is detachably secured to the handle 44 and is disposed approximately in parallel relation to the forked arms 45 of the rake 46, instead of being terminally curved. A plate 47, similar to the member 37, is formed on the shank 42 and is held in place on the handle 44 by U-clips 48 and connecting bolts 49. The implement shown in Fig. 5 is adapted to be used in the same manner as is the preferred form of tool.

The modified form of my invention shown in Fig. 6 differs from the device as shown in Fig. 4 in that the rake element 50 is provided with a shank 51 and is detachably secured to the handle 52 of the hoe 53. The shank 51 is equipped with a channel-shaped attaching plate 54, similar to the member 37 of Fig. 4. Clips 55 and bolts 56 are employed in securing the member 54 to the handle 52 in the same manner as are the members 38 and 39 employed.

Having thus described the invention, what is claimed as new is:

1. A combination garden implement including a rake having a body bar formed with a plurality of rake teeth and provided with fork arms extending laterally from one side thereof, and a hoe including a blade having a shank extending therefrom and connected to the rake adjacent the inner extremities of said arms, said shank extending in spaced relation upon one side of the fork arms with the outer extremity of the shank terminating in lateral spaced relation upon one side of the body bar of the rake to support the blade in spaced relation to the said body bar, the space between the body bar and the fork arms of the rake and between the hoe blade and the shank thereof being entirely unobstructed whereby the shank will be adapted to direct weeds or grass over the rake and beneath the said shank.

2. A combination garden implement including a rake having a body bar provided with a plurality of rake teeth extending laterally therefrom, there being intersecting fork arms connected to the body bar and extending laterally upon one side thereof, and a hoe including a blade having a shank extending therefrom and connected to the rake adjacent the intersection of said arms, the said shank extending in spaced relation upon one side of the fork arms with the outer extremity of the shank terminating in lateral spaced relation upon one side of the body bar of the rake and with the said blade directed laterally in the direction of the free ends of the rake teeth and extending obliquely and forwardly relative to the plane of said teeth, the blade being spaced laterally upon one side of the body bar and being of a width to extend throughout the major portion of the length of said bar to provide a deflecting plate adapted to direct grass or weeds over the body bar and between said fork arms, the space between the body bar and the fork arms of the rake and between the hoe blade and the shank thereof being entirely unobstructed.

3. A combination garden implement including a rake provided with a handle, the said rake being formed with a body bar having a plurality of rake teeth extending laterally therefrom, fork arms connected to the terminals of the body bar and secured to the handle, a hoe mounted upon the rake, the said hoe including a blade having a shank extending laterally therefrom, a channel shaped plate formed on the free terminal of said shank and seating against the inner extremity of the handle, a clip coacting with said plate, and means detachably connecting the clip to the plate, the hoe blade being supported in spaced relation laterally upon one side of the body bar and directed laterally in the direction of the free ends of the rake teeth to extend obliquely and forwardly relative to the plane of said teeth, the space between the blade and said shank and the body bar and fork arms of the rake, being entirely unobstructed.

In testimony whereof I affix my signature in presence of two witnesses.

OTTO H. TEMTE. [L. S.]

Witnesses:
 E. A. MICKELSEN,
 O. O. OSTAND.